(12) United States Patent
Schenk et al.

(10) Patent No.: US 11,500,595 B2
(45) Date of Patent: Nov. 15, 2022

(54) PRINTING-OPTIMIZED SECURITY ELEMENTS

(71) Applicant: HEIDELBERGER DRUCKMASCHINEN AG, Heidelberg (DE)

(72) Inventors: Stefan Schenk, Wiesenbach (DE); Marc Woschei, Uetersen (DE)

(73) Assignee: Heidelberger Druckmaschinen AG, Heidelberg (DE)

(*) Notice: Subject to any disclaimer, the term of this patent is extended or adjusted under 35 U.S.C. 154(b) by 53 days.

(21) Appl. No.: 17/206,482

(22) Filed: Mar. 19, 2021

(65) Prior Publication Data

US 2021/0294543 A1 Sep. 23, 2021

(30) Foreign Application Priority Data

Mar. 19, 2020 (DE) .......................... 102020107592.8

(51) Int. Cl.

| G06F 3/12 | (2006.01) |
|---|---|
| H04N 1/44 | (2006.01) |
| H04N 1/60 | (2006.01) |
| G06K 15/10 | (2006.01) |

(52) U.S. Cl.
CPC .......... G06F 3/1222 (2013.01); G06F 3/1238 (2013.01); G06F 3/1284 (2013.01); G06K 15/102 (2013.01); H04N 1/4446 (2013.01); H04N 1/60 (2013.01)

(58) Field of Classification Search
None
See application file for complete search history.

(56) References Cited

U.S. PATENT DOCUMENTS

| 10,834,287 | B1* | 11/2020 | Chakrabarty | .......... H04N 1/626 |
|---|---|---|---|---|
| 2022/0201153 | A1* | 6/2022 | Kobayashi | ......... G06K 15/1807 |

FOREIGN PATENT DOCUMENTS

| DE | 102008012425 A1 | 9/2009 | |
|---|---|---|---|
| DE | 102016201709 A1 | 8/2017 | |
| JP | 2021005365 A | * 1/2021 | .............. B41J 29/00 |
| WO | 2005122010 A1 | 12/2005 | |

* cited by examiner

*Primary Examiner* — Thomas D Lee
(74) *Attorney, Agent, or Firm* — Laurence A. Greenberg; Werner H. Stemer; Ralph E. Locher

(57) ABSTRACT

A method for printing documents with security elements carried out by two separate, computer-supported systems. The computer-supported systems each have a printing system with a printing machine and a security system that perform steps of preparing a document with placeholders for the security elements in the image data by the computer of the security system, and transmitting the document to the printing system. The image data is converted into an output color space of the printing machine by the computer of the printing system, and the document is transmitted to the security system. The security elements are generated, and replacement of the placeholders with the security elements by the computer of the security system is performed. The document is transmitted to the printing system. The finished document is printed with the security elements by the printing machine of the printing system.

8 Claims, 3 Drawing Sheets

PRINTING-OPTIMIZED SECURITY ELEMENTS

CROSS-REFERENCE TO RELATED APPLICATION

This application claims the priority, under 35 U.S.C. § 119, of German application DE 10 2020 107 592.8, filed Mar. 19, 2020; the prior application is herewith incorporated by reference in its entirety.

BACKGROUND OF THE INVENTION

Field of the Invention

The invention concerns a method for generating printing-optimized security elements.

The invention relates to the technical field of security printing.

The generation of security features, in particular those with hidden images, is carried out in a closed system due to the security requirements. In existing solutions, the generating software and the checking software are obtained from the same firm. Since most of the solutions that work with hidden images do not have any knowledge of the specific printing process, but the hidden images have to be generated in the process colors used later, the image data are converted, using a neutral ICC profile, such as, for example, ISO coated v3, into the CMYK color space, and the security elements are generated in the corresponding color separations. The checking software here expects the hidden structures as they were generated. However, in the case of varying print substrates, or of other color systems, in particular in the case of digital printing machines that operate, for example, with CMYKOGV instead of CMYK as process colors, with a corresponding shift in the color locations of the primary colors, this can only be ensured to a limited extent or only at the price of sometimes marked color deviations.

This then leads, in the prior art, to a variety of problems. For example:
a) When the specified separations are obtained, marked color deviations from the planned color appearance may result, and the printed product can therefore be unsaleable.
b) In the case of a color conversion from, for example, CMYK to CMYKOGV, the security element can become unreadable, and the protection is thereby no longer provided.
c) In the case of deviating color systems, only the color separations that were originally planned are used for the security element and not all of the separations that exist.

Until now, the only known solution for this is to attempt to prevent the destruction of the security element by the color conversion by retaining the separations intended.

International patent disclosure WO 2005/122010 A1 furthermore provides a method and a system for in-RIP processing and printing of variable documents. The method of the invention includes the generation of a page description language file (PDL file) that defines the fixed and variable elements, and a data file that defines instances of the variable elements, and the processing of the PDL file in combination with the data file in a raster image processor (RIP), in order to render the variable document in the image memory of a digital output device. The invention further includes subjecting the variable elements to a transformation in accordance with algorithms that are contained in the PDL file. In a further aspect, the method includes the in-RIP creation of multiple instances of the variable document. In this aspect, the PDL file contains a loop or a series of nested loops that are processed in order to render one or a plurality of instances of the variable document. The system of the invention contains a software application that is able to generate the PDL files and the data files according to the present invention; a RIP that is able to process the PDL files in combination with the data files; and a digital output apparatus that is connected to the RIP and which can print documents according to the invention.

BRIEF SUMMARY OF THE INVENTION

The object of the present invention thus consists of disclosing a method for the generation of print-optimized security elements in which the color stability of security elements is ensured during a conversion into various color spaces.

This object is achieved through a method for printing documents with security elements carried out by two separate, computer-supported systems. These consist of a printing system with a printing machine and a security system that contains the steps of preparing a document with placeholders for the security elements in the image data by the computer of the security system and transmission of the document to the printing system, conversion of the image data into an output color space of the printing machine by the computer of the printing system, and transmission of the document to the security system, generation of the security elements and replacement of the placeholders with the security elements by the computer of the security system, and transmission of the document to the printing system, and printing the finished document with security elements by the printing machine of the printing system. Crucial for the solution of the problem that the security elements are converted into another color space and that color information is therefore lost, which impairs the validity of the security element, is here that the image data of the document to be printed is first converted with placeholders into the output color space of the printing machine. When the printing system has appropriately converted the image data, it transmits these, together with information about the characterizing data to be used by its printing machine for the printing process, back to the security system. With this information, the security system can then generate the security elements in the correct color space, and thereby replace the placeholders. The finished document is then sent to the printing system which can then finish the printing with its printing machine in the output color space of the relevant printing machine.

Advantageous, and therefore preferred, developments of the method emerge from the associated subsidiary claims as well from the description with the associated drawings.

One preferred development of the method according to the invention here is that the placeholder in the document is prepared by the security system in the form of a description of the security element that will be used later. In this way it is ensured that the printing system has available to it as much data as possible about the document that will later be printed when converting the image data of the document into the output color space of the printing machine, in order to thus enable the most accurate possible conversion with the output color space at this stage.

A further preferred development of the method according to the invention here is that the computer of the security system provides the document, together with the placeholders, with a first security key, in particular in the form of an OAuth2-token, for the placeholder. The first security key is deactivated during the conversion of the image data into the output color space, and the computer of the printing system activates the first security key, prepares and activates a second security key for the complete document, and sends the document with both security keys to the computer of the security system which checks the validity of both security keys and, if they are valid, replaces the placeholders with the generated security elements. The use of both security keys is necessary in order to ensure that both the image data in the form of placeholder and document itself cannot be changed apart from by the two authorized instances of the security system and the printing system. The use of security elements is finally only necessary with appropriately security-critical printed objects such as, for example, banknotes or certain certificates. On receipt of the document converted into the output color space, the security system thus checks the validity of both security elements, and only if these are both positive are the placeholders replaced by the generated security elements, and the document sent back to the printing system that has been authorized and authenticated in this way.

A further preferred development of the method according to the invention here is that hidden images are used as security elements. The method according to the invention is also suitable for the use of other types of security elements. Primarily, however, hidden images are used.

A further preferred development of the method according to the invention here is that an inkjet printing machine is used as the printing machine, whose output color space is a CMYKOGV color space. It is again true here that the method according to the invention can also be used for other types of printing machines and other color spaces. The primary application for the present invention, however, relates to inkjet printing machines which, in the preferred form of embodiment, use a CMYKOGV color space.

A further preferred development of the method according to the invention here is that the computers of the printing system and of the security system transmit the documents over secured data channels. The security of the overall method can be raised even further in this way, in addition to the use of security keys for the placeholder and the document. The precise form in which the data channels are secured is not particularly important for the method of the invention. The data channels can be secured using various types of encryption algorithms, or through a secure channel as is used in VPNs or similar technologies.

A further preferred development of the method according to the invention here is that the computer of the security system, while specifying the later printing conditions, requests a suitable ICC profile either from the computer of the printing system or from a third instance. In the case of the third instance, the computer of the security system then sends the ICC profile to the computer of the printing system, and the computer of the printing system then converts the image data into the output color space of the printing machine by means of the ICC profile. The specification of the later printing conditions in the form of characterizing data that describe the printing process can take place in, for example, the form of an ICC profile. This does, however, mean that the security system can appropriately deal with ICC profiles and can also process them. Since ICC profiles are, however, a widely used way of describing a printing process for a specific printing machine in the light of the conversion into the output color space, this means is preferably applied here. In principle, however, other ways of specifying the later printing conditions are possible as characterizing data.

The invention as such, as well as constructive and/or functionally advantageous developments of the invention, are described in more detail below with reference to the associated drawings on the basis of at least one preferred exemplary embodiment. Elements that correspond to one another are given the same reference signs in the drawings.

Other features which are considered as characteristic for the invention are set forth in the appended claims.

Although the invention is illustrated and described herein as embodied in printing-optimized security elements, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
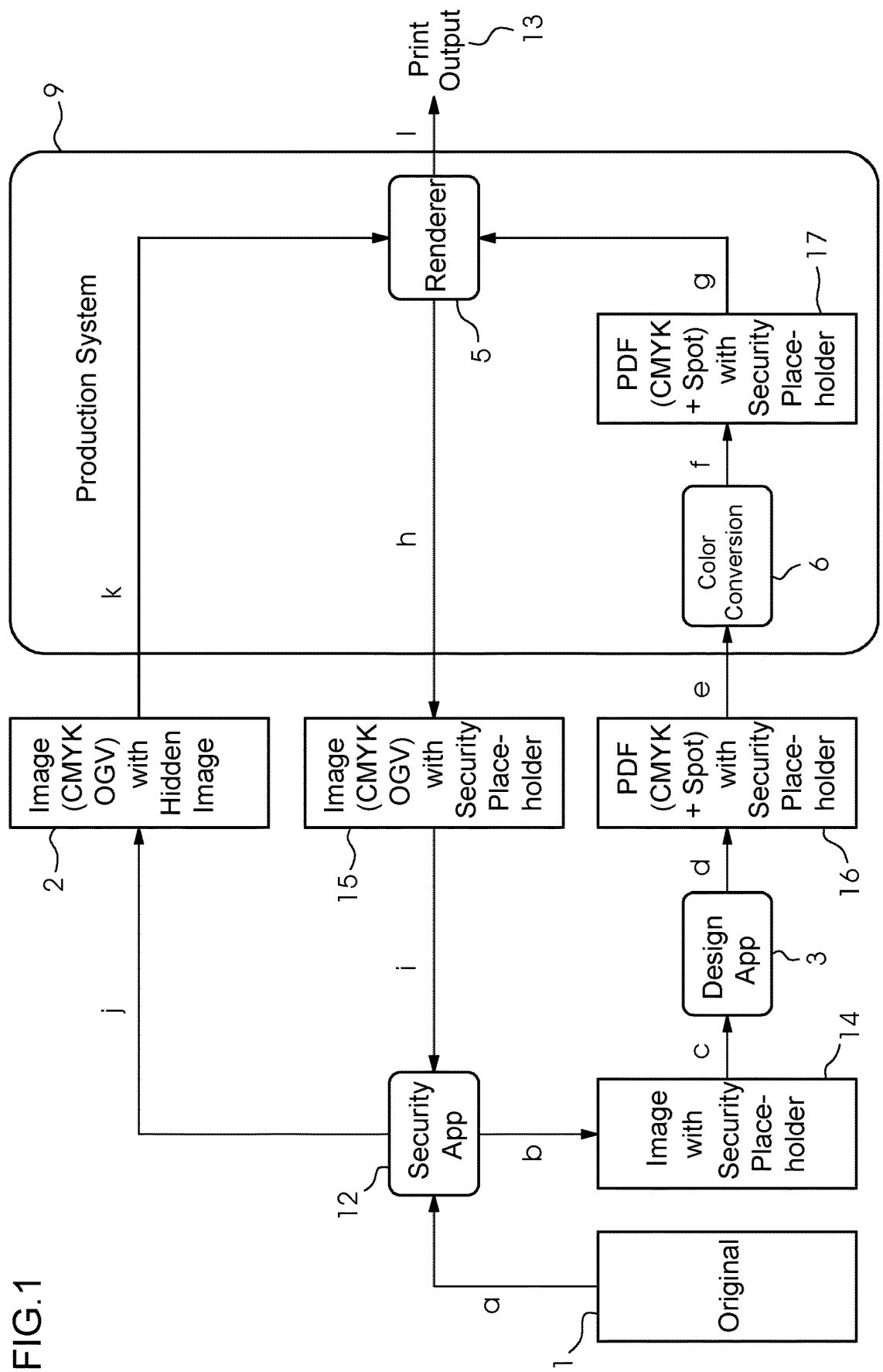
FIG. 1. is an illustration showing a flow of a method according to the invention in its preferred form of embodiment.

Referring now to the figures of the drawings in detail and first, particularly to FIG. 1 thereof, there is shown schematically a flow of a method according to the invention in its preferred form of embodiment, in which the sequence of the method steps extends from a) to I). The file that is to be protected as the original document 1 in the encoding software, a security app 12, is, in the first step, provided only with a description of the later security encoding, as a hidden image, and a security key, for example in the form of a OAuth2-token. The file, with a placeholder for a security element 14, is used in the normal design process, and the corresponding design document is prepared and output, with a placeholder for the security element, as a PDF file 16. The security key for the final embedding of the security encoding (hidden image) is deactivated during this time.

In the context of the print order, the PDF file 16 is provided with a further security key, and the security key for the final embedding of the security encoding (hidden image) is activated, although it is only valid in combination with the security key of the PDF file 16.

When the document is processed, the element or elements with a planned security encoding is or are extracted, after the separation by the color conversion app 6, into the output color space, further processed by a renderer 5 as the color-space-converted PDF file with a placeholder for a security element 17, and the color-space-converted image file obtained in this way, with a placeholder for the security element 15, is sent back via a secured channel to the encoding software 12. This checks the validity of both security keys, and, if valid, generates an image file with the planned security encoding (hidden image) 2. The image file 2 that has been provided with the security encoding is sent back to the production system 9, and replaced in the production file for the print output 13.

The production is then continued as planned.

Through the use of a separated content for the planned printing process, the separations used are matched to the real printing process. Since the printing process is more and more frequently changed between different output technologies such as, for example, offset and/or digital, it is only through the generation and embedding of the security element during the printing process that the color impression and functionality of the security element can be guaranteed. This entails the advantage that the security element, as a hidden image, remains unimpaired by the proposed method, and is only minimally affected by the calibration. The accuracy of the color reproduction is, in addition, also ensured when the output process is changed.

Figure 2:
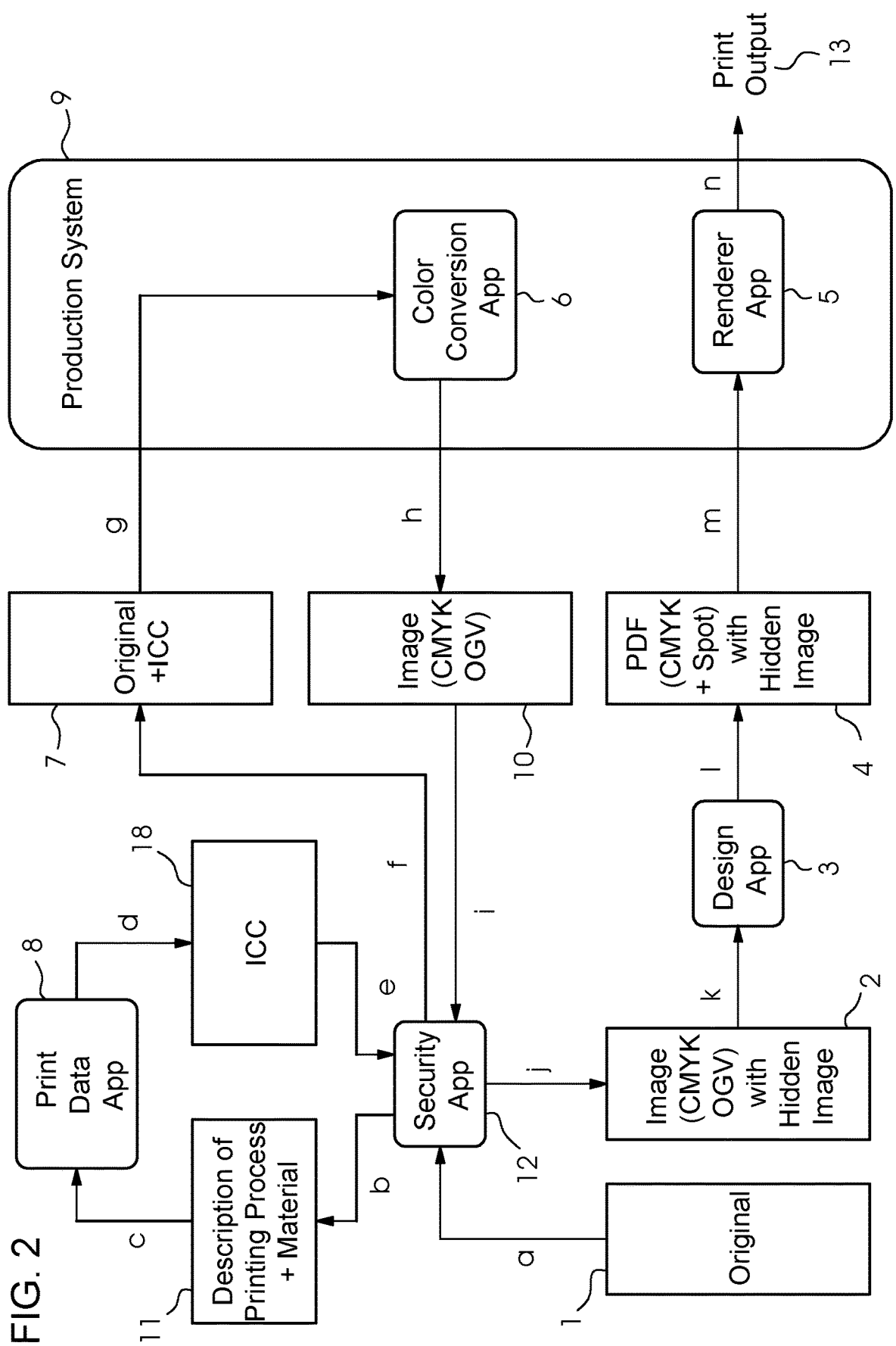
FIG. 2 is an illustration showing the flow of the method according to the invention in a first alternative form of embodiment.

Other alternative variants are also conceivable, in addition to the preferred form of embodiment described. FIG. 2 thus shows a first alternative in the form of direct generation in the security app as the encoding software 12, with improved separation on the basis of a print database and a separate color conversion software, the print data app 8. In this variant, the security app 12, while specifying the later print conditions 11, requests a suitable ICC profile 18, and sends the unprocessed original document with ICC table 7 to the color converter app 6 which separates the original document 7 in accordance with the specified ICC profile 18, and appends the ICC profile 18 to the original document 7. The color-space-converted image file 10 that has been separated in this way is then returned to the security app 12. The file 10 is now given the security encoding (hidden image), and is further processed by the design app 3 into an output PDF file with the hidden image 4, and prepared for printing by the renderer 5. A check of the achievable color accuracies can now be carried out during the print output 13 of the output PDF file with hidden image 4 obtained in this way on the basis of the ICC profile 18.

Figure 3:
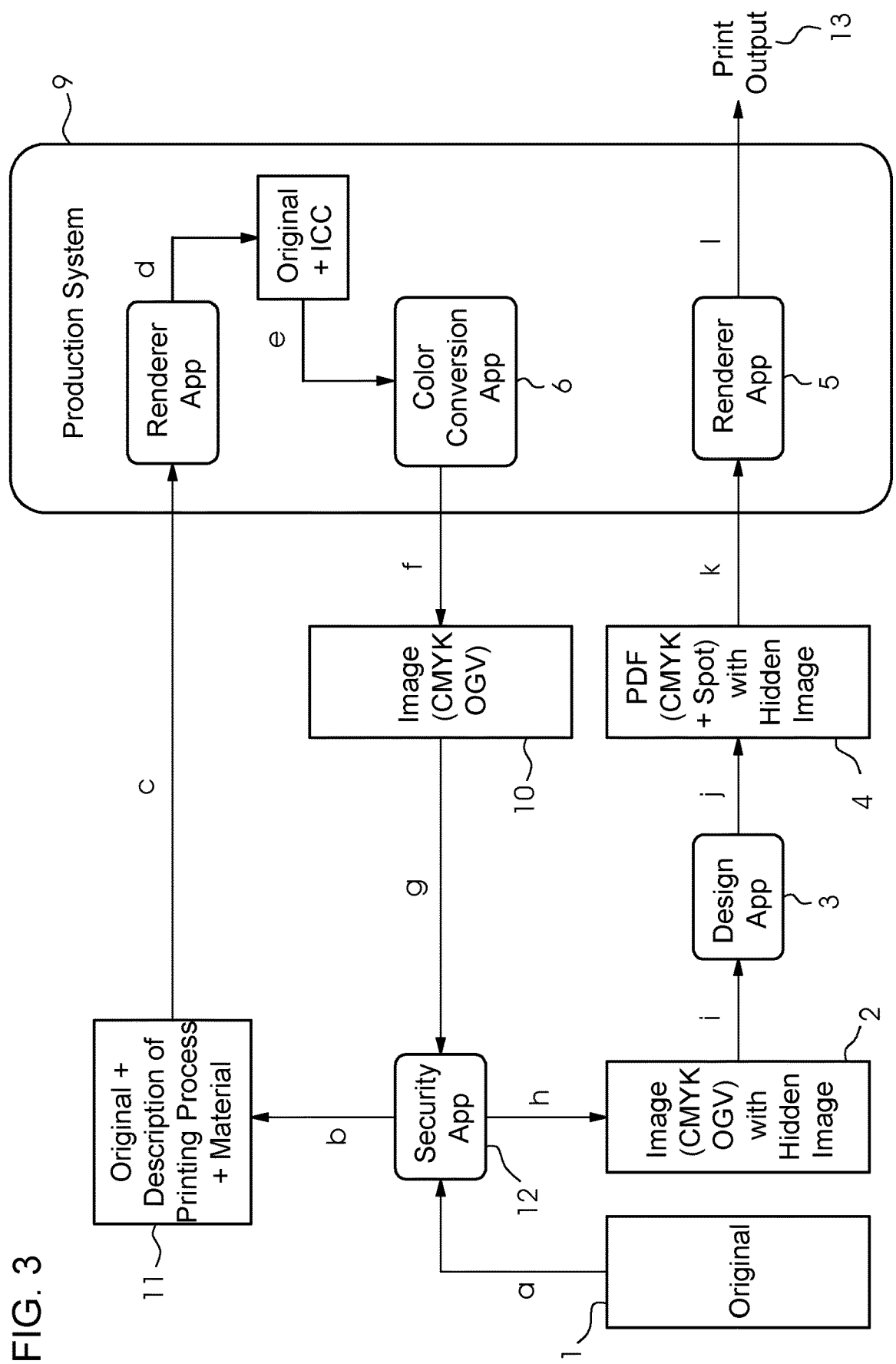
FIG. 3 is an illustration showing the flow of the method according to the invention in a second alternative form of embodiment.

A further alternative form of embodiment is disclosed in FIG. 3. Of central importance here is the direct generation in the security app 12 with improved separation by means of a production system 9 that contains a print data app 8 including a print database and the color conversion software 6. In this variant, the security app 12, stating the later print conditions 11, queries the production system 9, which specifies a suitable ICC profile 18 and color separates the original documents with the ICC table 7 according to the predefined ICC profile 18, and appends the ICC profile 18 to the file. The color-space-separated image file 10 is then again here returned to the security app 12. This file 10 is then provided with the security encoding (hidden image) and further processed as in FIG. 2. A check of the achievable color accuracies can then be carried out on the basis of the ICC profile 18 during the print output 13.

It is disadvantageous to both alternative forms of embodiment that a large color deviation is still possible if the planned printing process is incorrectly selected.

The following is a summary list of reference numerals and the corresponding structure used in the above description of the invention:

1 Original document
2 Image file with hidden image
3 Design app
4 PDF file with hidden image
5 Renderer
6 Color conversion app
7 Original document with ICC table
8 Print data app
9 Production system including printing machine
10 Color-space-converted image file
11 Description of the printing conditions
12 Security app
13 Finished printed product
14 Image file with placeholder for security element
15 Color-space-converted image file with placeholder for security element
16 PDF file with placeholder for security element
17 Color-space-converted PDF file with placeholder for security element
18 ICC profile

The invention claimed is:

1. A method for printing documents with security elements carried out by two separate, computer-supported systems, the two separate, computer-supported systems having a printing system with a printing machine and a security system, which comprises the following steps of:
preparing a document with placeholders for the security elements in image data by a computer of the security system and transmitting the document to the printing system;
converting the image data into an output color space of a printing machine by the computer of the printing system, and transmitting the document to the security system;
generating the security elements and replacing the placeholders with the security elements by the computer of the security system, and transmitting the document to the printing system; and
printing the document with the security elements by the printing machine of the printing system.

2. The method according to claim 1, which further comprises preparing the placeholder in the document by the security system in a form of a description of a security element that will be used later.

3. The method according to claim 1, wherein the computer of the security system provides the document, together with the placeholders, with a first security key for the placeholder, wherein the first security key is deactivated during a conversion of the image data into the output color space, and the computer of the printing system activates the first security key, prepares and activates a second security key for the document, and sends the document with both the first and second security keys to the computer of the security system which checks a validity of both the first and second security keys and, if they are valid, replaces the placeholders with the security elements generated.

4. The method according to claim 3, wherein the first security key is in a form of an OAuth2-token.

5. The method according to claim 1, which further comprises using hidden images as the security elements.

6. The method according to claim 1, which further comprises using an inkjet printing machine as the printing machine having a output color space that is a CMYKOGV color space.

7. The method according to claim 1, wherein the computers of the printing system and of the security system transmit the documents over secured data channels.

8. The method according to claim 1, wherein the computer of the security system, while specifying later printing conditions, requests a suitable International Color Consortium profile either from the computer of the printing system or from a third instance, wherein, in a case of the third instance, the computer of the security system then sends the ICC profile to the computer of the printing system, and the computer of the printing system then converts the image data into the output color space of the printing machine by means of the ICC profile.

* * * * *